(No Model.)
A. C. DIETZ.
HARNESS CHECK HOOK.
No. 288,696. Patented Nov. 20, 1883.
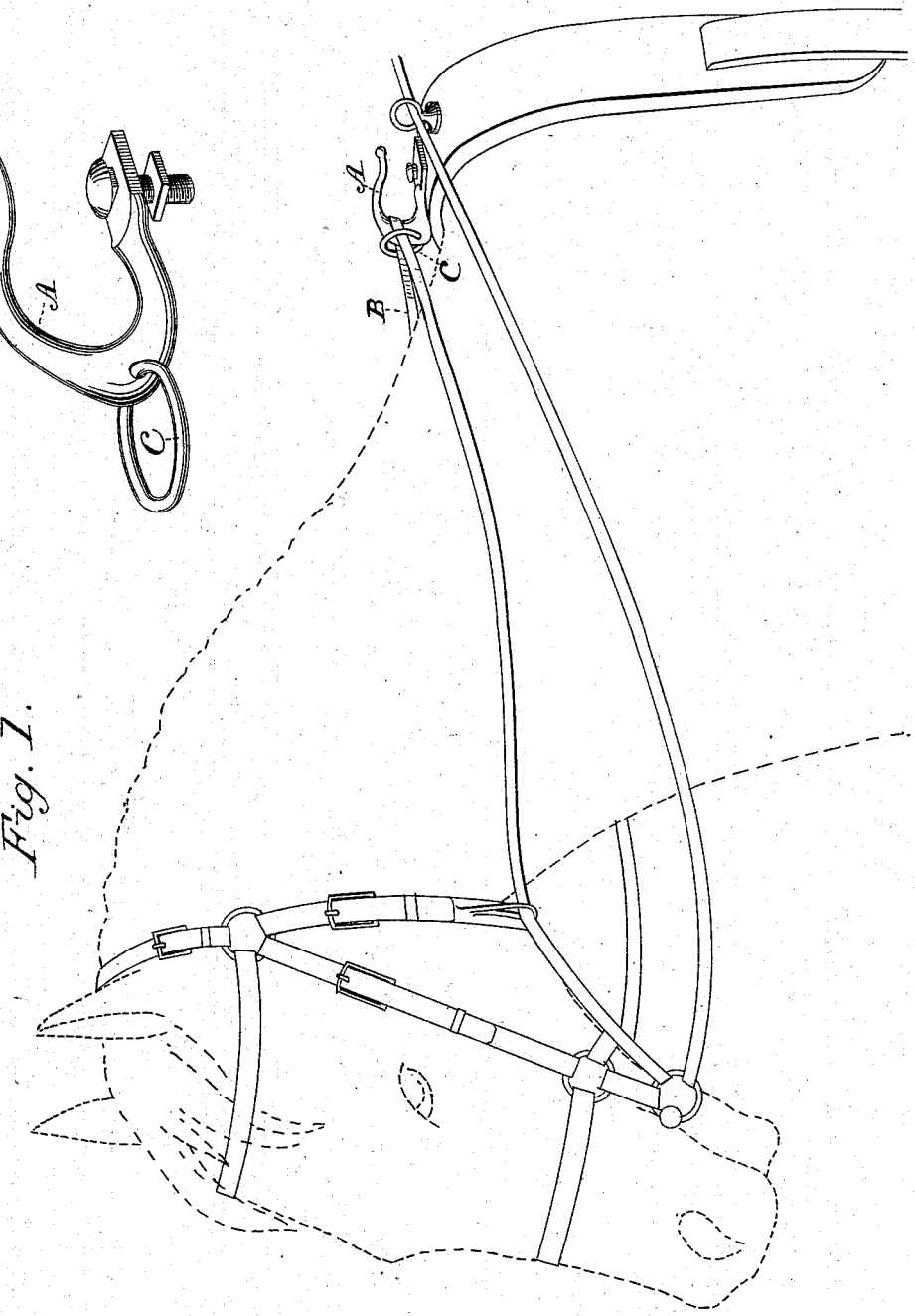

UNITED STATES PATENT OFFICE.

ALFRED C. DIETZ, OF SAN FRANCISCO, CALIFORNIA.

HARNESS CHECK-HOOK.

SPECIFICATION forming part of Letters Patent No. 288,696, dated November 20, 1883.

Application filed July 3, 1883. (No model.)

*To all whom it may concern:*

Be it known that I, ALFRED C. DIETZ, of the city and county of San Francisco, and State of California, have invented an Improvement in Harness Check-Hooks; and I do hereby declare the following to be a full, clear, and exact description thereof.

My invention relates to harness check-hooks, in which I employ a wide open ring slipping loosely through a hole in the thickened front end of the check-hook, which allows the bight of any strap or check-rein to be introduced, and when it is in place it is allowed to move freely through the ring and hook as the horse moves his head from side to side.

My invention further relates to a novel harness check-hook; and it consists of a hook to receive and hold the check-rein, and, in combination therewith, of a means for preventing the rein from being thrown out or disengaged from the hook, as will be more fully explained by reference to the accompanying drawings, in which—

Figure 1 is a view of my hook, showing the application. Fig. 2 is a perspective view of my device.

A is a hook, of the usual or any convenient form, this hook being attached to the harness-saddle, with the point of the hook and the opening toward the rear.

The check-rein B has its bight attached to the hook when in use; but it is apt to become detached by the tossing and movement of the horse's head, and many devices have been contrived to prevent this.

In my invention, C is a ring or loop which is attached to the front of the check-hook. In the present case I have shown it passing through a transverse hole in the front part of the hook, which may be thickened for this purpose; or, if desired, it may pass through a lug projecting from the front of the hook. This ring is of sufficient diameter to allow the bight of the check-rein to pass through it before being passed over the point of the hook, and when the rein rests in the inner curve of the hook the ring forms a lock to prevent the rein being drawn backward or lifted out of the hook. The rein is easily drawn through it to attach or detach it.

I do not claim, broadly, a keeper pivoted to a check-hook, having the sides cut away, as I am aware that such a device has been patented.

Having thus described my invention, what I claim as new, and desire to secure by Letters Patent, is—

A harness check hook having its front portion provided with a lug or projecting portion, with a hole made transversely through it, in combination with a circular ring slipping freely in said hole, and having a space upon each side of the hook, so that the rein which passes through it may slide freely around the hook, substantially as herein described.

In witness whereof I have hereunto set my hand.

ALFRED C. DIETZ.

Witnesses:
S. H. NOURSE,
HENRY C. LEE.